United States Patent
Ho et al.

(10) Patent No.: US 6,628,961 B1
(45) Date of Patent: Sep. 30, 2003

(54) DEVICE AND A METHOD FOR CONNECTING A MOBILE PHONE HANDSET TO AN EXTERNAL KEYBOARD

(75) Inventors: Martin Ho, Hsin Tien (TW); Chun Jiang, Shanghai (CN)

(73) Assignee: Inventec Electronics (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 09/633,083

(22) Filed: Aug. 4, 2000

(51) Int. Cl.[7] .......................... H04Q 7/08; H04M 1/02; G06F 3/02
(52) U.S. Cl. .................. 455/554; 455/557; 455/575; 455/90; 455/550; D14/247
(58) Field of Search .................. 455/90, 550, 556, 455/557, 558, 575; D14/244, 247, 235, 146

(56) References Cited

U.S. PATENT DOCUMENTS

| | | | | |
|---|---|---|---|---|
| 4,674,111 A | * | 6/1987 | Monet et al. ................... 379/8 |
| 5,020,090 A | * | 5/1991 | Morris ........................ 455/556 |
| 5,127,041 A | * | 6/1992 | O'Sullivan .................. 455/557 |
| 5,127,050 A | * | 6/1992 | Takahashi et al. ..... 379/428.04 |
| 5,553,122 A | * | 9/1996 | Haber et al. ............. 379/93.09 |
| 5,553,312 A | * | 9/1996 | Gattey et al. ............. 455/11.1 |
| 5,625,673 A | * | 4/1997 | Grewe et al. ............... 455/556 |
| 5,924,044 A | * | 7/1999 | Vannatta et al. ............. 455/556 |
| 6,101,562 A | * | 8/2000 | Chang et al. .................. 710/73 |
| 6,108,200 A | * | 8/2000 | Fullerton ...................... 361/686 |
| 6,115,616 A | * | 9/2000 | Halperin et al. ............. 455/557 |
| 6,128,372 A | * | 10/2000 | Tsai et al. ................. 379/90.01 |

FOREIGN PATENT DOCUMENTS

| | | | | |
|---|---|---|---|---|
| DE | 19640645 A1 | * | 9/1997 | ............. G06F/1/16 |
| JP | 2002041214 A | * | 2/2002 | ............. G06F/3/02 |
| JP | 2002196864 A | * | 7/2002 | ........... G06F/3/023 |

* cited by examiner

Primary Examiner—Dwayne Bost
Assistant Examiner—Kamran Afshar
(74) Attorney, Agent, or Firm—Oppenheimer Wolff & Donnelly LLP

(57) ABSTRACT

The present invention relates to a device and a method for connecting a mobile phone handset to an external keyboard. A multimedia card slot interface is included in the portable keyboard of the present invention, which can be incorporated to the original interface of the handset. In the meantime, a microprocessor and a random access memory are also included in the keyboard. After sending an interrupt command from the handset to the keyboard, by scanning the keyboard, whether the key is pressed or not is determined by the microprocessor and the key value is stored in its own random access memory. When the key value is stored in the random access memory, an interrupt command is sent to the handset by the keyboard. After the handset is ready, the key value will be transferred to the handset via the multimedia card slot interface.

17 Claims, 9 Drawing Sheets

DEVICE AND A METHOD FOR CONNECTING A MOBILE PHONE HANDSET TO AN EXTERNAL KEYBOARD

FIELD OF THE INVENTION

The present invention relates to a device for the mobile phone handset, more particularly, it relates to a device for the mobile phone handset which is interfaced to an external keyboard through a multimedia card (MMC) slot, and a method for transmitting the data with such device.

BACKGROUND OF THE INVENTION

In recent years, the telecommunication services have been developed vigorously, and the trend of the market with liberalization has been formed, wherein considerable opportunities are concealed in the wireless communication. Thus, the normal communication industries, from the system equipment enterprises of the upstream to the terminal equipment enterprises, such as electronic notebook (or referred to as Personal Digital Assistant, PDA) or the mobile phone handset enterprise; of the downstream, from the equipment manufacturers to the telecommunication companies, all of them are competing to occupy a scat in the communication market.

In the wireless communication, the mobile data can be served to receive and transmit short messages in the Chinese format, to receive the finance stock quotations, e-mail, speech mailbox, information inquiry and the like. So a set of light, thin, short and small electronic notebooks, has been developed by many enterprises. Furthermore, they are capable of two-way transmission and the Internet is popularized. Therefore, they will be products of the new generation.

However, besides the electronic notebooks, the mobile phone handsets (abbreviated as handset hereinafter) which have been developed earlier and involve infinitive potentiality are in tremendous demand on the market. Apart from using the handset directly for speech communication, using it for transmitting the short message data is increasingly popular. Therefore, it is desirable to have handsets that can receive and transmit e-mail incorporated the above electronic notebooks, as well as the handsets for carrying out the video transmission.

The front view of a conventional handset is shown as in FIG. 1. Because the limitation of the volume of the handset 100, only the digit keys of 0–9 and several function keys of the key 120 can be installed under the screen 110 (for the handsets of the new generation, the size of screen 110 is increasing, and the space of the key 120 is reducing). When it is required to input the characters or short message other than the digit, only the digit keys of 0–9 can be used, and other characters must be incorporated into the digit keys. For example, alphabets a, b, and c are also involved in the digit key "2" of the key 120. When "b" is input by the user, the user must realize first that "b" corresponds to the digit key "2", then, "b" will not derived until this key has been pressed for three times (if Chinese characters are input, then the input method of which will be more complicated).

The user may bear with this discrepancy, if only few characters are required to input to the handset, for example, when a directory function or a short message function are established. But if the handset is used to transfer e-mail, the user will face the input a large amount of characters. At this time, if it is input by the fixed keyboard on the handset only, the input action will be tedious and inefficient. This will be a problem that greatly disturbs the user since the E-mail transmission on handset is an inevitable trend today.

SUMMARY OF THE INVENTION

In view of the invention background described above, the input method of the conventional handset is rather inconvenient, since it must use the multipurpose digital keys for operation. But nowadays, a large amount of the electronic information is transferred, the action that utilizes a handset to input will occur more often. For example, the transfer of e-mail is one such action. At this time, inputting by a single handset will be complicated and inefficient. Thus, the main object of the present invention is to implement the input action of the handset with the aid of connecting externally a portable keyboard.

Another object of the present invention is to connect externally a portable keyboard by utilizing the original multimedia card slot transmission interface of the handset without the need for preparing another interface.

Yet another object of the present invention is to utilize such portable keyboard which is connected externally for the convenience of the data transmission.

The portable keyboard according to the above objects of the present invention comprises a multimedia card slot transmission interface. This is an interface with seven pins, and there are several keys on the keyboard for the convenience of inputting. Separate microprocessor (MPU) and random access memory (RAM) are also included in the external keyboard. When the portable keyboard is inserted to the handset via an MMC interface, the connectors on the MMC interface will be checked first by the handset, if it is MMC memory card, then the service program of MMC will be called, otherwise, the external keyboard mode will be entered, and the portable external keyboard will be instructed to enter the interrupt mode.

After the external keyboard entering the interrupt mode, the sequence number of the keyboard will be scanned, and the value that represents the key will be calculated and stored in the random access memory of the external keyboard, then an interrupt request will be sent to the handset. After the interrupt request from MMC interface is received by the handset, the interrupt service program of the external keyboard for the handset will be entered, then the external keyboard is instructed to enter the data transmission mode, and the key value will be obtained by the handset from the specific random access memory of the external keyboard via MMC interface, and the key value obtained will be input to the buffer memory of the handset's own. In the meantime, the external keyboard will be set to the interrupt mode again for receiving the next batch of data.

Through the above process, the key value of the external keyboard can be transferred to the handset and displayed on the LCD display screen of the handset, and the input method of the portable external keyboard of the present invention is completed.

Separate microprocessor and random access memory are included in the portable external keyboard of the present invention, thus a separate system is formed. When the portable external keyboard is connected to the handset and after the keyboard being instructed to enter the interrupt mode, the external keyboard is used to input a large amount of the data, for example, to input a directory or a short message, even to send E-mail and the like by pressing the key, and it is not limited by few keys on the handset and the complicated input method, so it is more simple and easier. In the meantime, the standardized MCC interface is used by the external keyboard, thus the same interface can be used commonly with the original MMC card so that further developing a different interface is not necessary and the multi-function effect is reached.

The preferred embodiments of the present invention will now be described in detail with reference to the accompanying drawings, wherein:

IN THE DRAWINGS

DETAILED DESCRIPTION OF THE PREFERRED EMBODIMENT

A device and a method for utilizing an external keyboard for the mobile phone handset is disclosed in the present invention. The design of the handset is developed toward light, thin, short, and small, but the LCD display screen disposed on the handset is developed toward the large size, so the space for the keys can only be further reduced in size. As described above, when the character information is required to input, the method of pressing the keys will be more complicated and inefficient, and if a large amount of the characters, such as transferring the e-mail, is input, then it will be inefficient and meaningless. But, by using the device and the method of the present invention, the disturbed problems can be solved.

Figure 1:
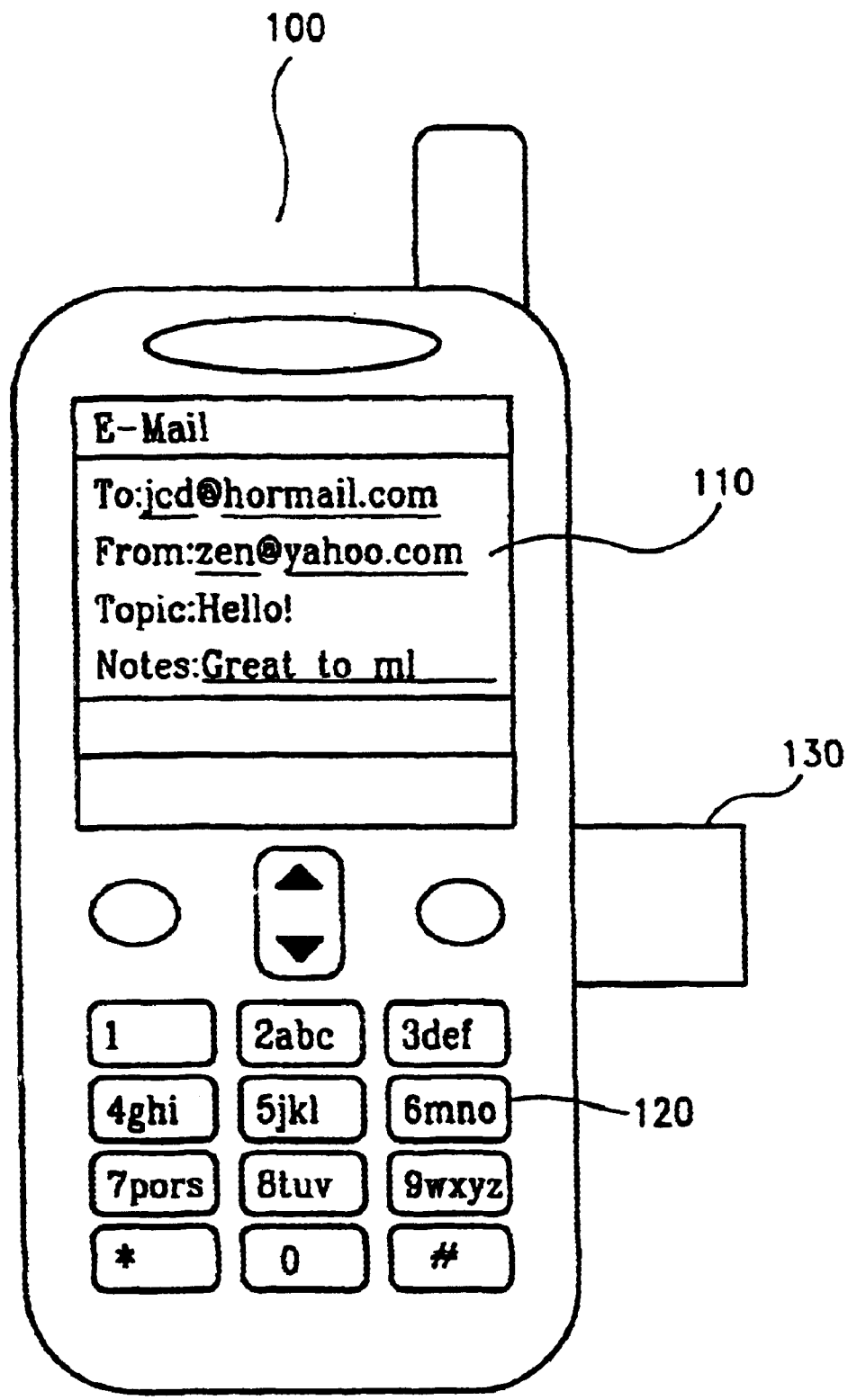
FIG. 1 is a front view of a conventional handset, showing a picture that the handset carries out an E-mail Transmission.

In the transmission standard of the external interface of the handset, there is a transmission interface known as multimedia card slot. As shown in FIG. 1, the section labeled 130 of the handset 100 is the multimedia card slot interface. This is a standard interface with seven signal pins. Normally, this interface is used to connect a device such as the memory card, for carrying out the expanding function such as the data storage.

Figure 2:
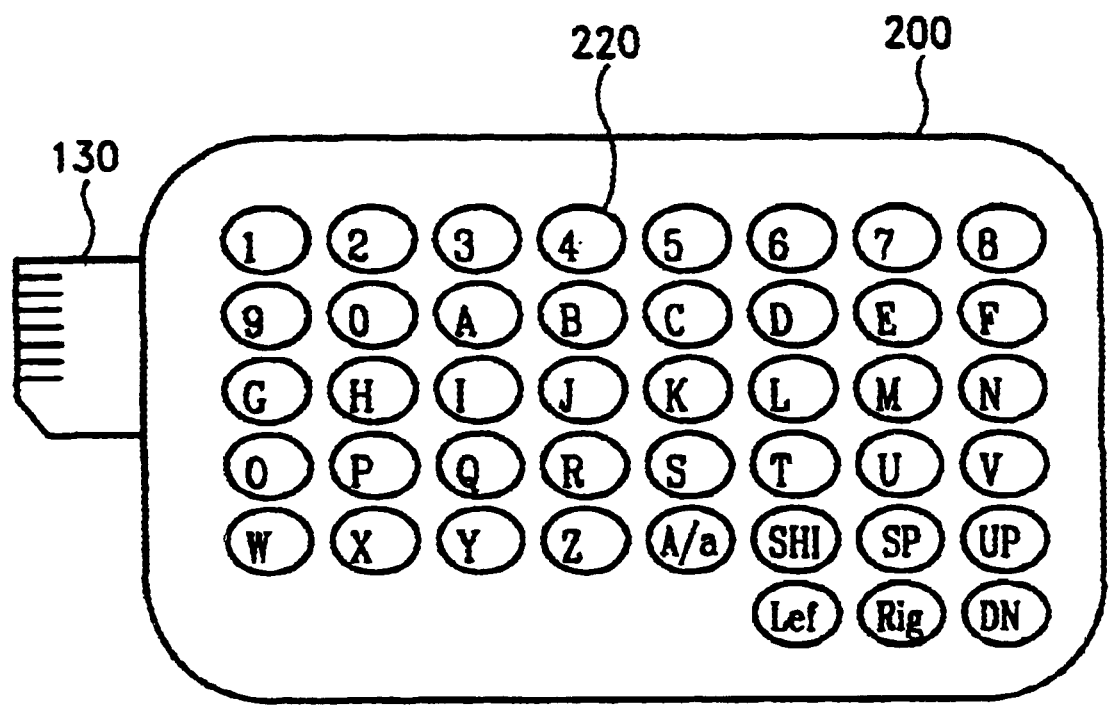
FIG. 2 is a schematic drawing according to an exemplary embodiment of the present invention, showing a portable external keyboard with multi-media card.

Referring to FIG. 2, an embodiment of the portable external keyboard of the present invention is shown. In the external keyboard 200, the size and the number of the key 220 can be designed on the basis of the practical requirement. But for the sake of convenience to input, it is necessary that the key 220 may include substantially at least one input key for each single alphabet such as the single English alphabet input keys shown in the drawing for example. In the meantime, the connecting interface of the external keyboard 200 is a standard MMC interface described above, that is, the interface labeled 130, as shown in the drawing. Within the interface 130, for example, pin 2 may receive or transmit commands specifically; and pin 7 is responsible for data transmission, while pin 3 and 6 provide the function of standard potential and the like.

Figure 3:
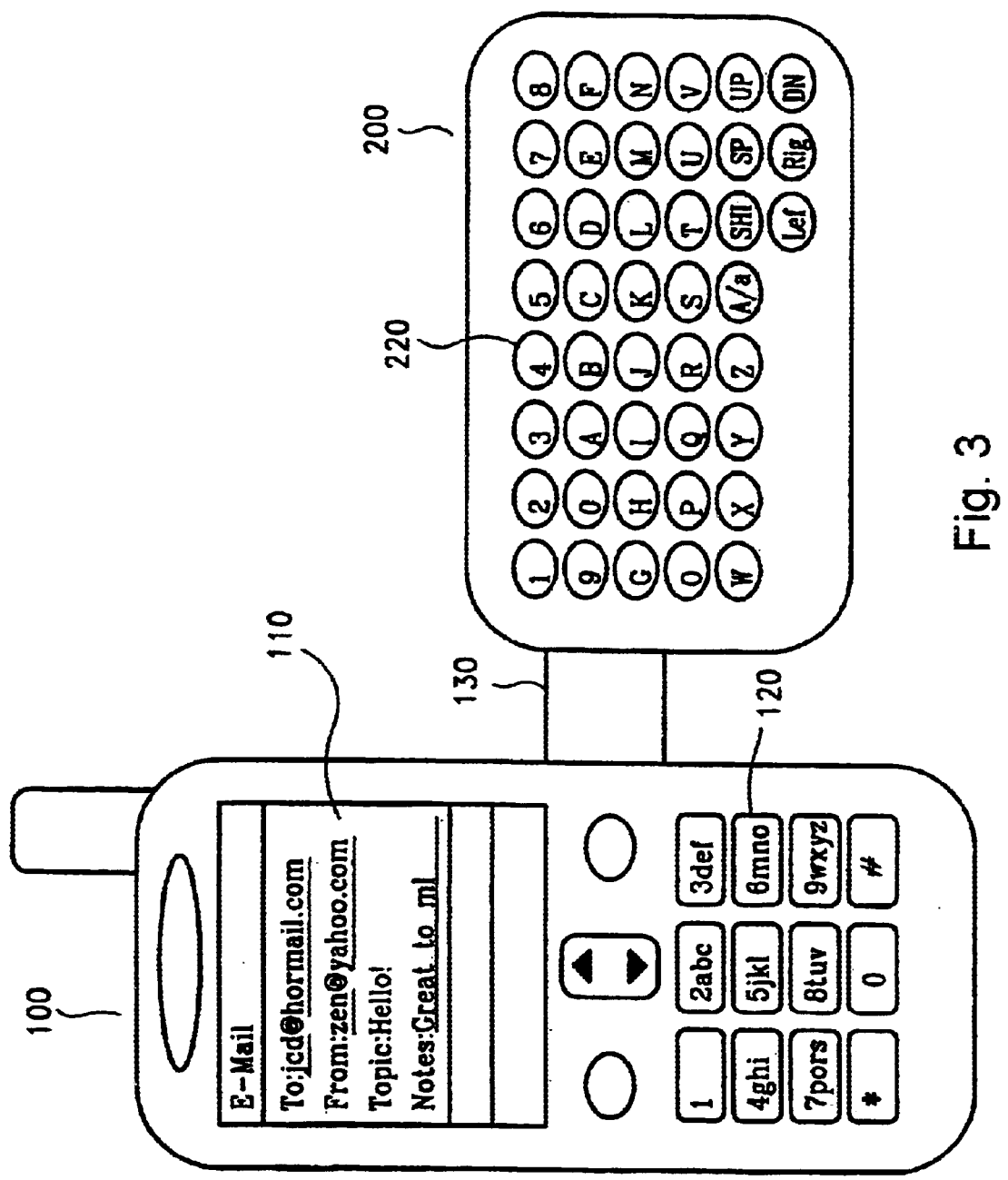
FIG. 3 is a schematic drawing according to an exemplary embodiment of the present invention, showing a handset coupled to the external keyboard.

Referring to FIG. 3, an embodiment of the connection mode of the external keyboard 200 according to the present invention is shown. In FIG. 3 the handset 100 and the external keyboard 200 are connected with each other via MMC interface 130. In the drawing of the present embodiment, although the keyboard 200 is externally connected similar as a card inserting mode, but other similar connection mode, such as external keyboard 200 is interconnected to the handset 100 via, connection wire and MMC connector, will also be one of the feasible ways.

Figure 4:
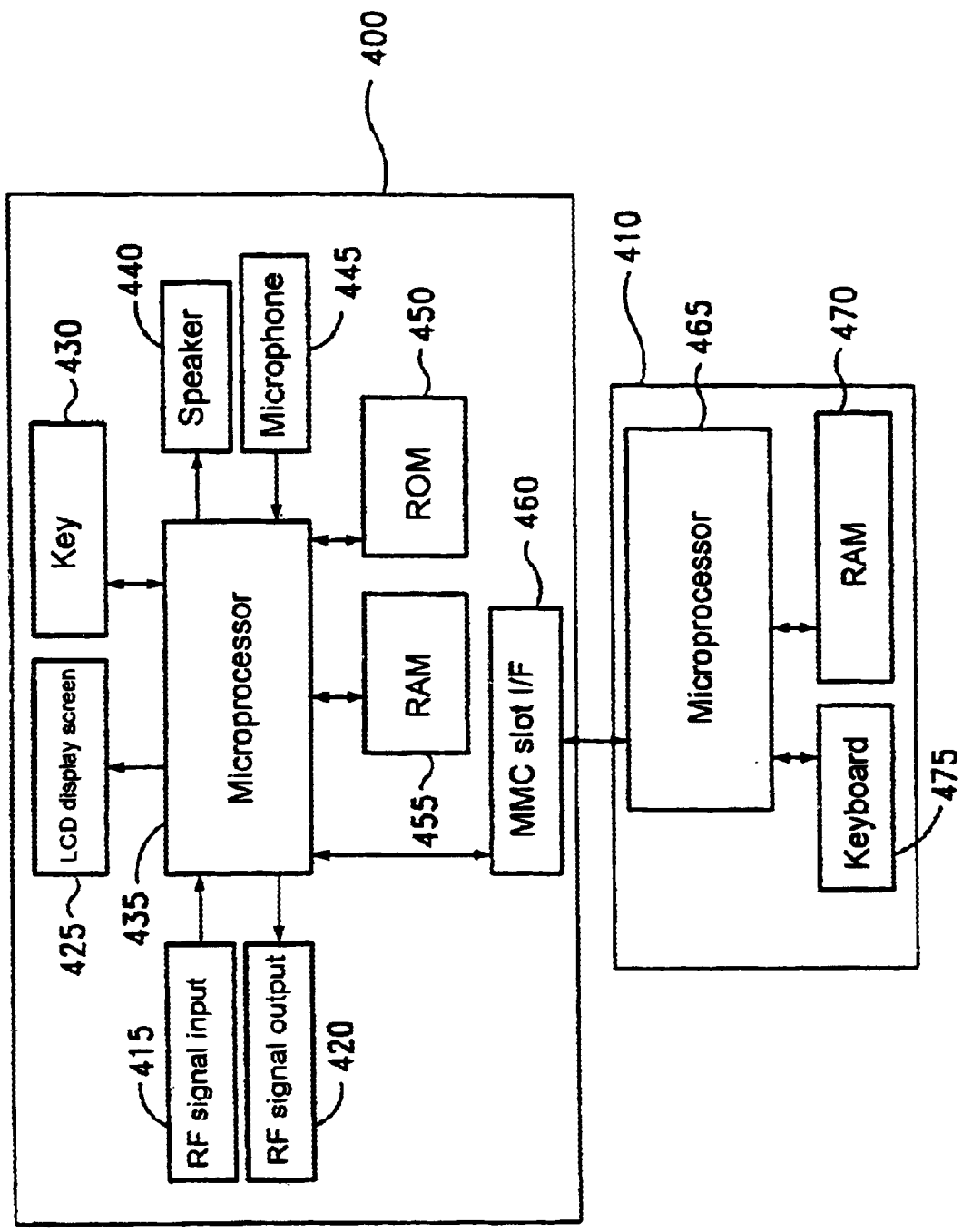
FIG. 4 is a system block diagram according to one embodiment of the present invention, showing the connection between the handset and the external keyboard.

Referring to FIG. 4, the system connection diagram of the handset and the external keyboard is shown, wherein label 400 represents the handset and label 410 represents the external keyboard. In the handset 400, label 415 is an RF (radio frequency) signal input module, and label 420 is an RF signal output module. Receiving and transmitting the RF signal is controlled by the microprocessor 435. The information may be temporarily stored in the random access memory (RAM) 455 by the microprocessor 435, while the service program stored in the read only memory (ROM) may be called by the microprocessor 435 for setting the function of the handset's own or the control function of the external device and the like. Storing and retrieving the information may be carried out by the user through key 430, LCD display screen 425, and a handset 400. During the verbal conversation through the handset 400, the speech data passing through the speaker 440 or the microphone 445 may be transferred via RF signal input/output module 415, 420 under the control of the microprocessor 435.

Furthermore, multimedia card slot interface 460 and the external keyboard 410 may be communicated with each other also under the control of the microprocessor 435. The external keyboard 410 of the present invention includes a microprocessor 465, a random access memory (RAM) 470 and a keyboard 475, thus, it may be considered as a separated system.

Figure 5:
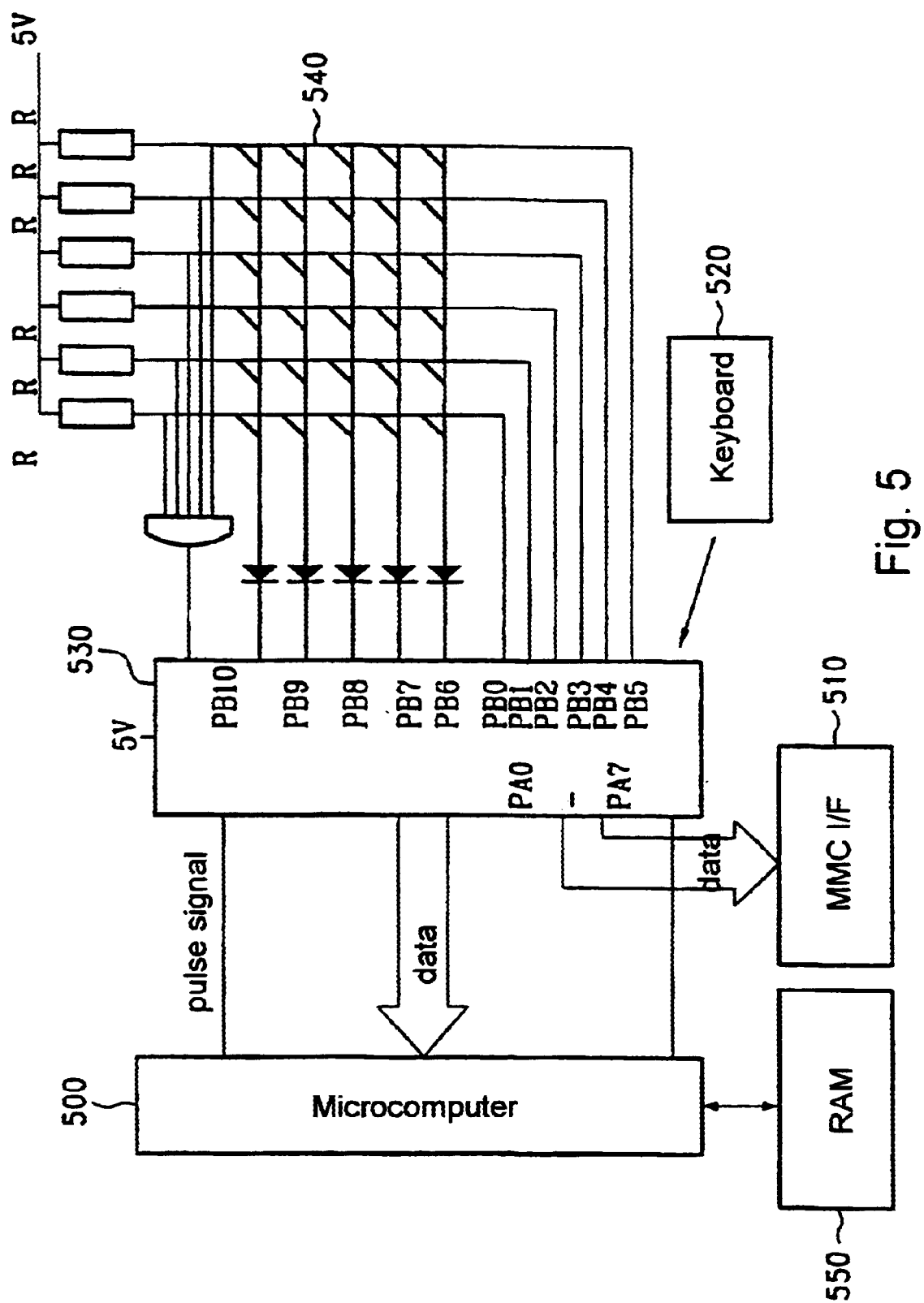
FIG. 5 is a circuit diagram of the external keyboard according to one embodiment of the present invention.

Referring to FIG. 5, a circuit diagram of the external keyboard of the present invention is shown. In FIG. 5, whether the key on the keyboard 520 has been pressed or not can be detected and processed by the microprocessor 500 via, for example, the interrupt mode or inquiry scanning mode. In order to reduce the number of contacts in the keyboard and to increase the efficiency, the keyboard may normally be arranged as a matrix circuit 540, and from it's logic state (switched on or switched off) and the applied voltage (for example, voltage 5V, as shown in the drawing), 'whether the key has been pressed or not may be decided. Then the value will be sent to a controller 530 which is specifically responsible for the data input/output processing, for further processing.

The data I/O processing controller chip 530 is controlled by the microprocessor 500. As shown in the drawing, they are interconnected via a pulse signal line, a data bus, an interrupt signal line and the like. When the data I/O processing chip 530 is set to the output mode, the data stored in the random access memory 550 will be sent to the processing chip 530 by the microprocessor 500, then the data will be sent to the handset (not shown) via MMC interface 510. However when the chip 530 is set to the input mode, the key data will be sent to the microprocessor 500 and stored in the random access memory 550.

Figure 6:
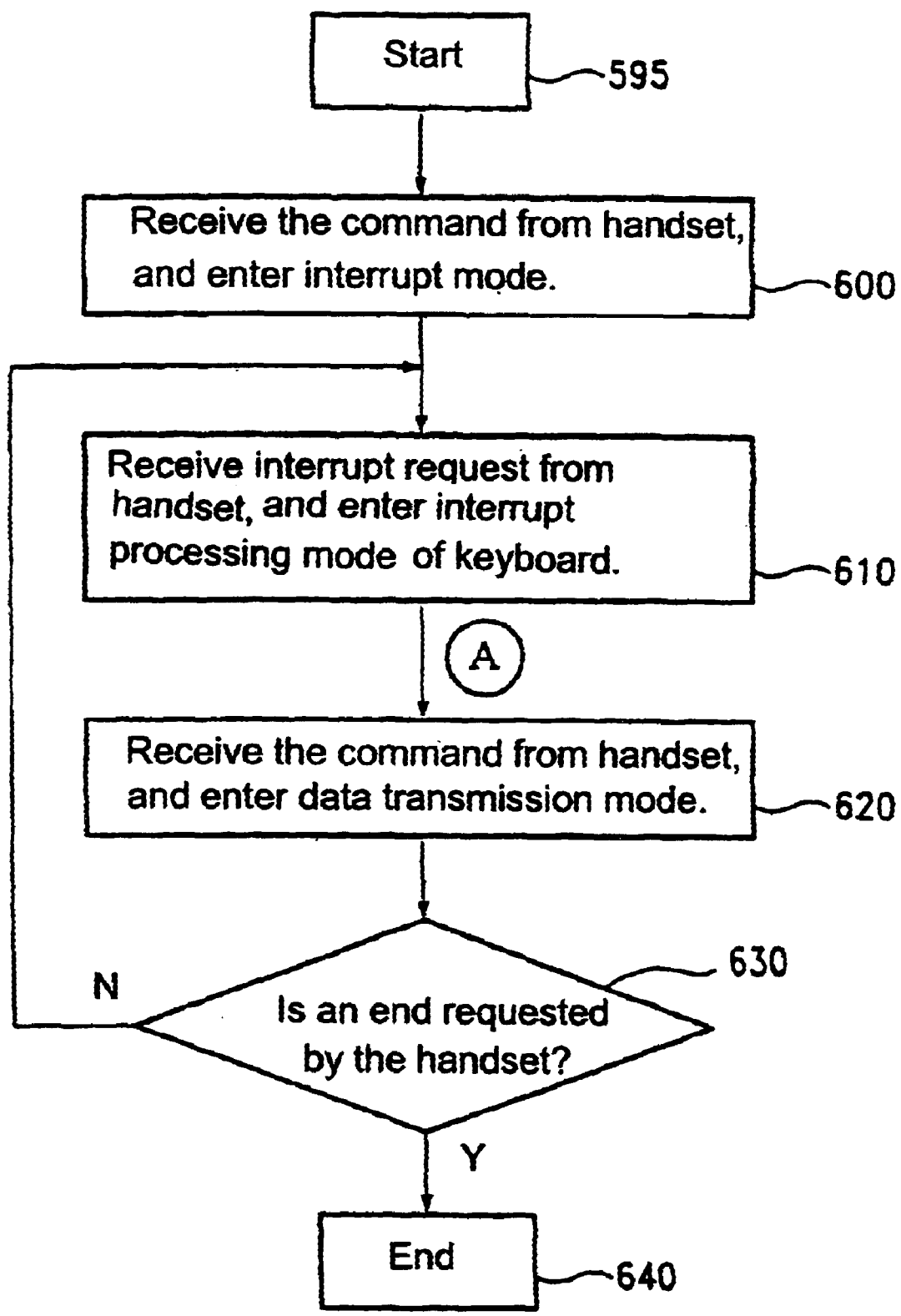
FIG. 6 is a software flowchart illustrating the operation of the external keyboard according to the present invention.

Now referring to FIGS. 6 to 9, the software flowchart and the interrupt service program flowchart of the external keyboard and the handset of the present invention are shown in these drawings. Referring to FIG. 6 first, this is a drawing of the software flowchart of the external keyboard. After starting from the block 595, when the external keyboard is connected to the handset, the connectors on the MCC is checked by the handset. If it is MCC card, then the service program of MCC. card will be called, otherwise the external keyboard service program will be called, and the external keyboard will be instructed to enter into interrupt mode (block 600). When the interrupt request from the handset is received by the external keyboard, the interrupt processing mode of keyboard itself will be entered (block 610). That is the mark A in the drawing.

Figure 7:
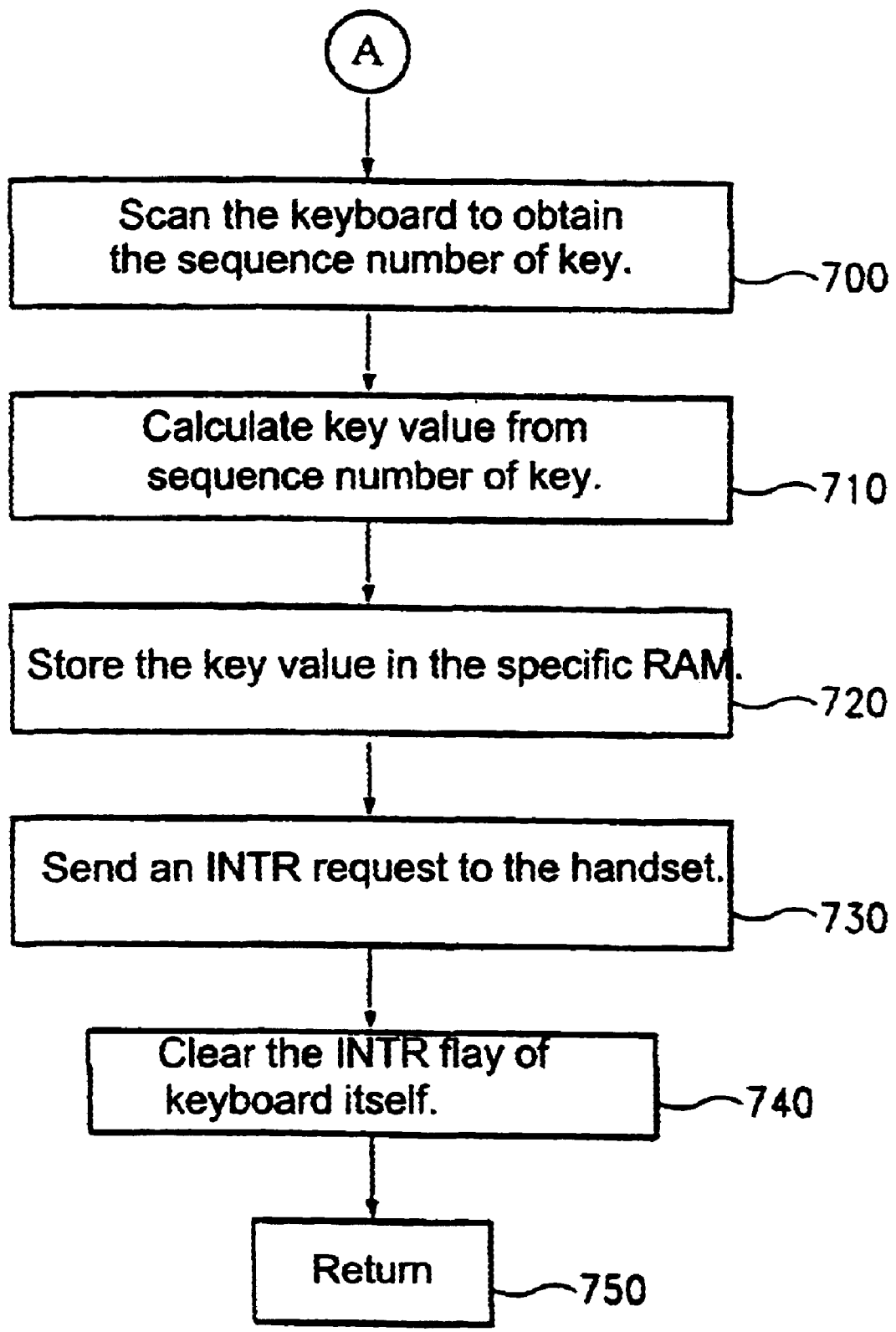
FIG. 7 is a flowchart of the interrupt service program of the external keyboard according to the present invention.

Then referring to FIG. 7, the interrupt processing mode flowchart of the external keyboard is shown. After the external keyboard entering the interrupt processing mode, it is waiting for the input data from the user. At this time, the matrix circuit (for example, the matrix circuit 540 in FIG. 5) of the keyboard will be scanned continuously by the interrupt processing program to detect the key pressed by the user, and the sequence number of the key will be obtained (block 700).

Next, the key value will be calculated from the key sequence number (block 710), and then this key value will be stored in the specific random access memory by the microprocessor (block 720), and an interrupt request will be sent to the handset (block 730) in order to transfer the key value to the handset. Then the interrupt flag of keyboard itself will be cleared (block 740) and the flow returns (block 750) to the external keyboard software process for waiting the next key pressed.

Now, returning to FIG. 6. When the key value is obtained and an interrupt request is sent to the handset by the external keyboard, a command will be sent from the handset to Inform the external keyboard that the data transmission mode is entered (block 620), then the key value stored is sent to the handset by the external keyboard via MMC interface. After that, the process goes to the block 630 and whether the data input program will be stopped by the handset is decided. If it is decided that the data input is continuous, then it will return to the block 610, otherwise, it will go to the block 640 and the software process of the external keyboard terminates.

Figure 8:
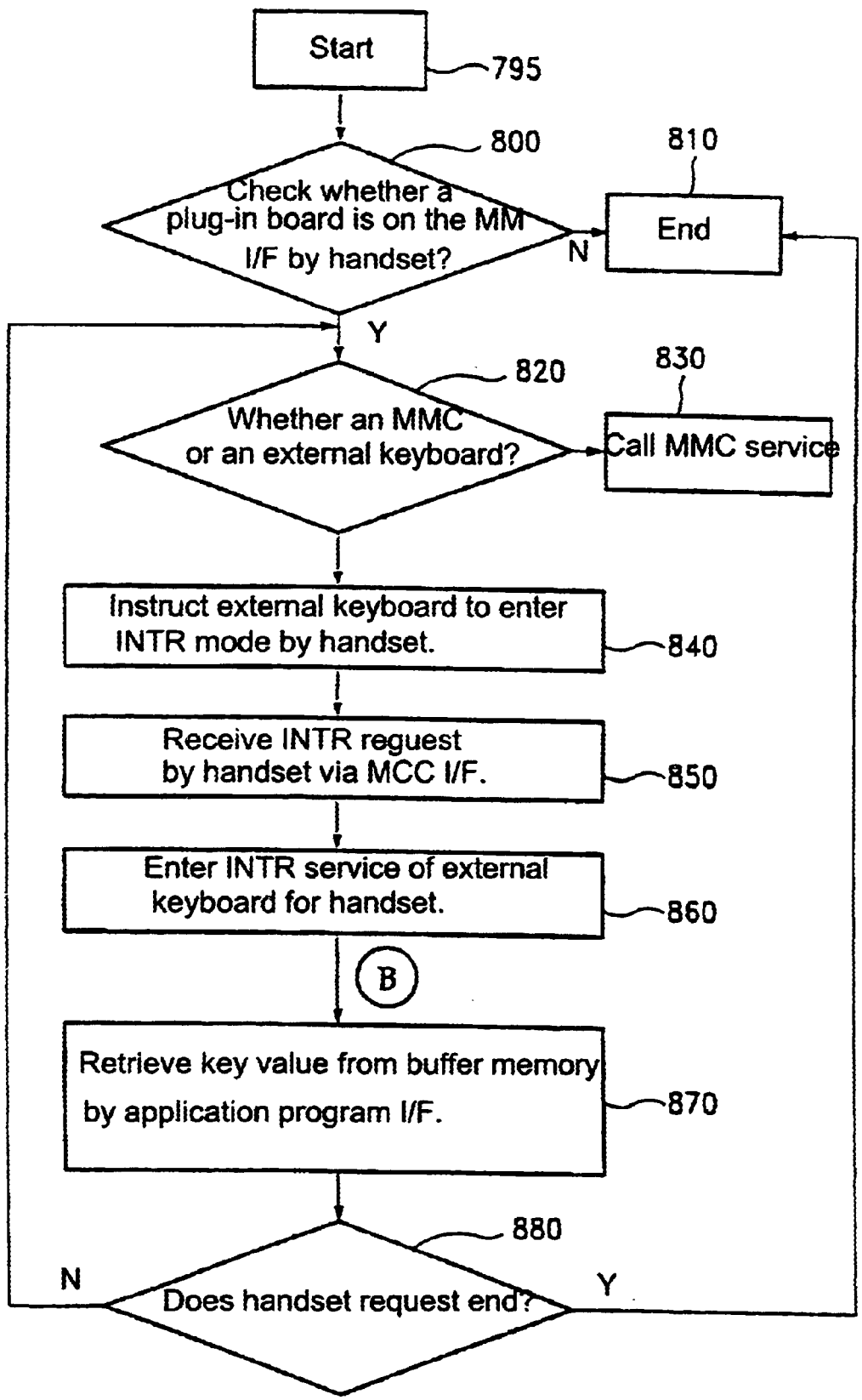
FIG. 8 is a software flowchart illustrating the operation of the handset according to the present invention.

Referring to FIG. 8, this is a software flowchart of the handset. After starting from the block 795, whether a plug-in board is on the MMC interface will be checked first by the handset (block 800). If there is no plug-in board, then the software process will terminate (block 810), otherwise the process proceeds to the block 820 to make a decision that this plug-in board is an MMC card or an external keyboard. If it is an MMC card, then MMC service program will be called (block 830), if it is an external keyboard, then the process continues to block 840. At this time the external keyboard is instructed by the handset to enter the interrupt mode, that is, a mode in which whether a key is pressed is detected continuously by the external keyboard as described above. In the meantime, as described above, when the external keys have been detected and stored, an interrupt request will be sent to the handset, and the interrupt request may be received by the handset via MMC interface (block 850). After that, the handset will enter the interrupt service program of the external keyboard for the handset block 860), that is, the section with the mark B.

Figure 9:
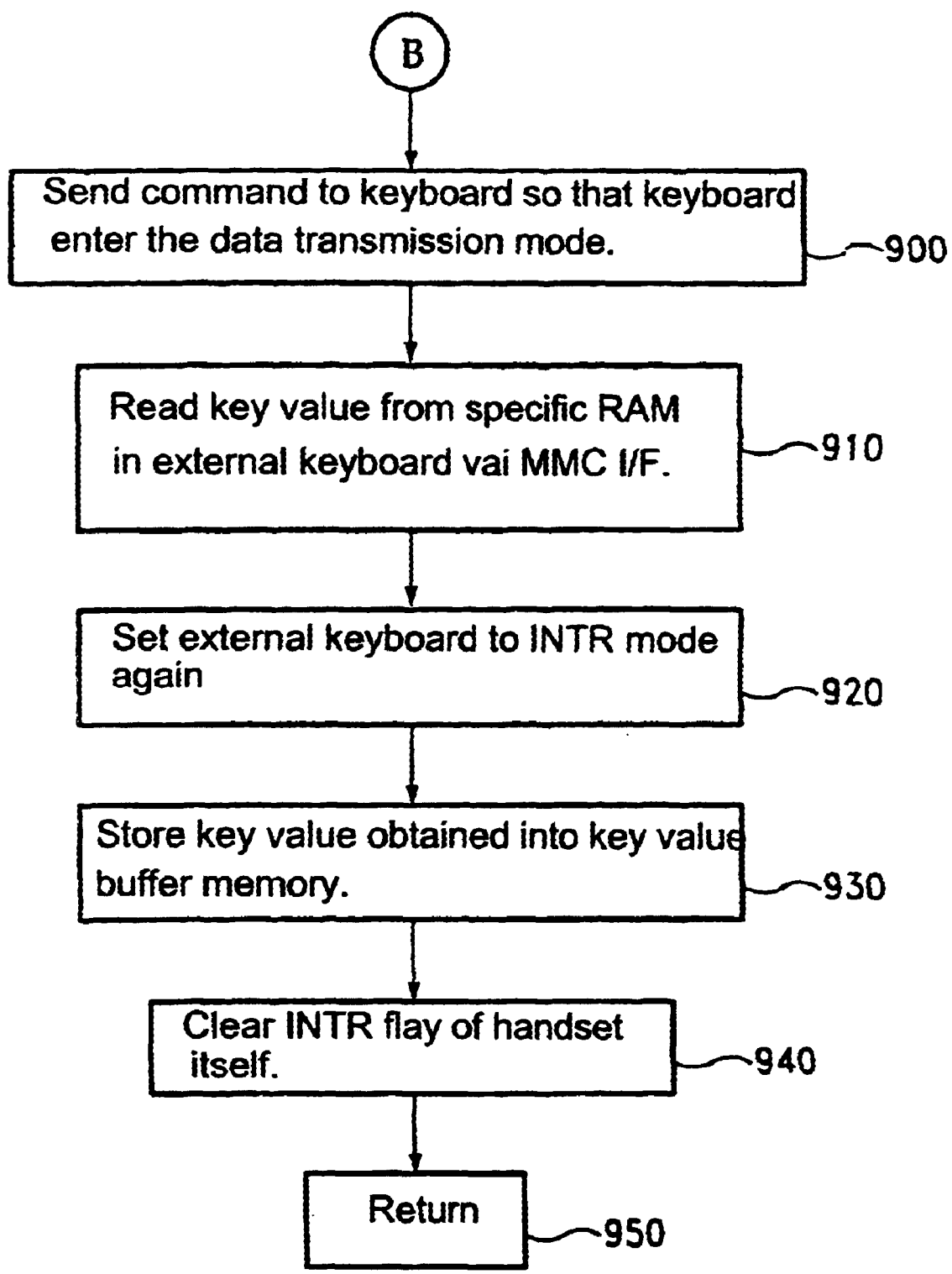
FIG. 9 is a flowchart of the interrupt service program of the external keyboard of the handset according to the present invention.

Then referring to FIG. 9, when it enters the interrupt service program of the external keyboard for the handset, a command is sent by the handset to the external keyboard first to allow the external keyboard to enter the data transmission mode (block 900). Then the key value will be read from the specific random access memory in external keyboard via MMC interface (block 910), that is, the key value stored in the external keyboard's own random access memory will be sent to the handset by the external keyboard's own microprocessor 465. Then the flow goes to the block 920 and the external keyboard is set to the interrupt mode again, and then the key value obtained will be input into the key value buffer memory of the handset (block 930). Finally, the interrupt flag of handset itself will be cleared (block 940), then the flow returns to the software process of the handset (block 950) and for waiting the next batch of data input.

Now, returning to FIG. 8. After the block 860 is implemented to enter the interrupt service program of the external keyboard for the handset and the key value is obtained, the application program interface will be called by the handset to retrieve the key value from the buffer memory (block 570) and to display it on the LCD display screen of the handset. Then, if the handset desires to terminate the input program, it will return to the end block 810, otherwise, it will return, to the block 820 and wait for the next batch of data input.

From the above portable external keyboard device and its transmission method of the present invention, the key value of the external keyboard can be transferred into the handset and displayed on the LCD display screen of the handset, thus the object of the present invention, i.e. inputting the data with a portable external keyboard, can be realized.

It will be apparent from the above description that the portable external keyboard of the present invention includes the separate elements such as the microprocessor and the random access memory and the like, so it is configured as a separate control system. By communicating between the handset body and the external keyboard, the key value of the external keyboard can be transferred to the handset, while it is not necessary to utilize the keys of the handset's own for inputting the data. When a large amount of data is required to input by the user, it will never be limited by the complicated input method of the handset. Thus, for example, it will be more convenient for transferring e-mail.

In the meantime, the interface of such external keyboard is a standardized MMC interface. MMC card and the external keyboard can be switched by the handset with ease, so that no extra interface should be further developed. Thus, by using such MMC interface, the multi function can be reached.

It is apparent to those skilled in the art that the above description is only an exemplary embodiment of the present invention, and it is not intended to use to limit the claim application scope of the present invention, thus the equivalent changes and modifications made without departing from the spirit disclosed by the present invention are all included in the attached claims.

What is claimed is:

1. An external keyboard device of a mobile phone handset, comprising:

a multimedia card slot interface is provided in said mobile phone handset; and a keyboard coupled to said mobile phone handset via said multimedia card slot interface;

the mobile phone handset receives a key value from the keyboard in the interrupt mode.

2. A device according to claim 1, wherein said mobile phone handset including an LCD display screen and the input keys.

3. A device according to claim 1, wherein said mobile phone handset including an RF input module and an RF output module.

4. A device according to claim 1, wherein said multimedia card slot interface of said mobile phone handset is externally coupled to a memory card.

5. A device according to claim 1, wherein said keyboard further comprising:

keys for data entry;

a random access memory for storing data entered; and a microprocessor for controlling said memory and transmission of data entered.

6. A device according to claim 5, wherein the storage and transmission of said data entered is processed by said microprocessor via an interrupt mode activated by the keyboard upon detecting key entered on the keyboard.

7. A device according to claim 1, wherein said mobile phone handset and said keyboard are communicated through interrupt mode.

8. A device according to claim 1, wherein after pressing the keyboard, said mobile phone handset enters into an interrupt mode.

9. A method for transmitting data by using an external keyboard of a handset, comprising:

verifying whether a keyboard is connected to a transmission interface of the handset;

instructing said keyboard to enter an interrupt mode, while said keyboard is connected to said handset;

detecting keys entered on said keyboard under the interrupt mode, and storing the value of the key entered in memory;

setting handset into an interrupt mode; and transmitting said key value to said handset via said transmission interface.

10. A method according to claim 9, wherein said handset including an LCD display and keys.

11. A method according to claim 9, wherein said handset including an RF input module and an RF output module.

12. A method according to claim 9, wherein said transmission interface of said handset is a multimedia card slot interface.

13. A method according to claim 9, wherein said multimedia card slot interface is connected externally to a memory card.

14. A method according to claim 9, further comprising:

transmitting an interrupt request from said keyboard to said handset and clearing an interrupt flag of said keyboard.

15. A method according to claim 9, further comprising:

setting said keyboard to enter an interrupt mode.

16. A method according to claim 9, further comprising:

clearing an interrupt flag of said handset.

17. A method according to claim 9, further comprising:

storing said key value in a memory by said handset.

* * * * *